(12) United States Patent
Nusser et al.

(10) Patent No.: US 9,733,646 B1
(45) Date of Patent: Aug. 15, 2017

(54) HETEROGENEOUS FLEET OF ROBOTS FOR COLLABORATIVE OBJECT PROCESSING

(71) Applicant: X Development LLC, Mountain View, CA (US)

(72) Inventors: Stefan Nusser, Palo Alto, CA (US); Troy Straszheim, Palo Alto, CA (US); John Zevenbergen, San Francisco, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/537,145

(22) Filed: Nov. 10, 2014

(51) Int. Cl.
*G05D 1/02* (2006.01)
*B65G 1/137* (2006.01)
*B65G 57/03* (2006.01)

(52) U.S. Cl.
CPC ........... *G05D 1/0287* (2013.01); *B65G 1/137* (2013.01); *B65G 57/03* (2013.01); *Y10S 901/01* (2013.01)

(58) Field of Classification Search
None
See application file for complete search history.

(56) References Cited

U.S. PATENT DOCUMENTS

| | | |
|---|---|---|
| 5,239,931 A | 8/1993 | Muselli et al. |
| 5,506,682 A | 4/1996 | Pryor |
| 5,825,981 A | 10/1998 | Matsuda |
| 6,909,940 B2 | 6/2005 | Hellman et al. |
| 7,602,143 B2 | 10/2009 | Capizzo |
| 7,646,336 B2 | 1/2010 | Tan et al. |
| 8,322,591 B2 | 12/2012 | Diez et al. |
| 8,403,614 B2 | 3/2013 | Bastian, II et al. |

(Continued)

FOREIGN PATENT DOCUMENTS

AU 2010235933 10/2010

OTHER PUBLICATIONS

System Logistics, "System Logistics APPS: Automatic Pick to Pallet System", Oct. 15, 2013, Youtube, https://www.youtube.com/watch?v=v5bPGIjENP8, Entire video.*

(Continued)

*Primary Examiner* — Rami Khatib
*Assistant Examiner* — Gerrad A Foster
(74) *Attorney, Agent, or Firm* — McDonnell Boehnen Hulbert & Berghoff LLP

(57) ABSTRACT

Example systems and methods may provide for a heterogeneous fleet of robotic devices for collaborative object processing in an environment, such as a warehouse. An example system includes a plurality of mobile robotic devices configured to transport one or more objects within an environment, a fixed robotic manipulator positioned within the environment that is configured to manipulate one or more objects within an area of reach of the fixed robotic manipulator, and a control system. The control system may be configured to cause one or more of the plurality of mobile robotic devices to deliver at least one object to at least one location within the area of reach of the fixed robotic manipulator, and to cause the fixed robotic manipulator to distribute the at least one object to a different one or more of the plurality of mobile robotic devices for delivery to one or more other locations within the environment.

18 Claims, 12 Drawing Sheets

(56) References Cited

U.S. PATENT DOCUMENTS

| | | | |
|---|---|---|---|
| 8,508,590 B2 | 8/2013 | Laws et al. | |
| 8,594,834 B1 | 11/2013 | Clark et al. | |
| 8,594,923 B2 | 11/2013 | Wong et al. | |
| 9,381,916 B1* | 7/2016 | Zhu | B60W 30/0956 |
| 2004/0167667 A1* | 8/2004 | Goncalves | G01C 21/12 |
| | | | 700/245 |
| 2008/0131255 A1 | 6/2008 | Hessler et al. | |
| 2009/0110525 A1* | 4/2009 | Criswell | B65G 67/08 |
| | | | 414/507 |
| 2011/0106294 A1 | 5/2011 | Bebbington | |
| 2012/0083960 A1* | 4/2012 | Zhu | G05D 1/0214 |
| | | | 701/23 |
| 2012/0191272 A1 | 7/2012 | Andersen et al. | |
| 2012/0213625 A1* | 8/2012 | Roberts | B65G 61/00 |
| | | | 414/788.1 |
| 2013/0009592 A1 | 1/2013 | Larsen et al. | |
| 2013/0184849 A1 | 7/2013 | Chan | |
| 2013/0317642 A1 | 11/2013 | Asaria et al. | |
| 2014/0074342 A1 | 3/2014 | Wong et al. | |
| 2014/0081445 A1* | 3/2014 | Villamar | G06Q 10/087 |
| | | | 700/216 |
| 2015/0032252 A1* | 1/2015 | Galluzzo | B25J 5/007 |
| | | | 700/218 |
| 2015/0290795 A1* | 10/2015 | Oleynik | G05B 19/42 |
| | | | 700/257 |

OTHER PUBLICATIONS

Kiva Systems, "Defying the Laws of Fulfillment, The KIVA Mobile Fulfillment System," http://www.kivasystems.com/media/45933/kiva%20systems%20brochure%20-%20defying%20the%20laws%20of%20fulfillment.pdf, 2007, pp. 1-8.

Swieringa et al., "Autonomous Battery Swapping System for Small-Scale Helicopters," 2010 IEEE International Conference on Robotics and Automation, Anchorage Convention District, May 3-8, 2010, Anchorage, Alaska USA, pp. 3335-3340.

* cited by examiner

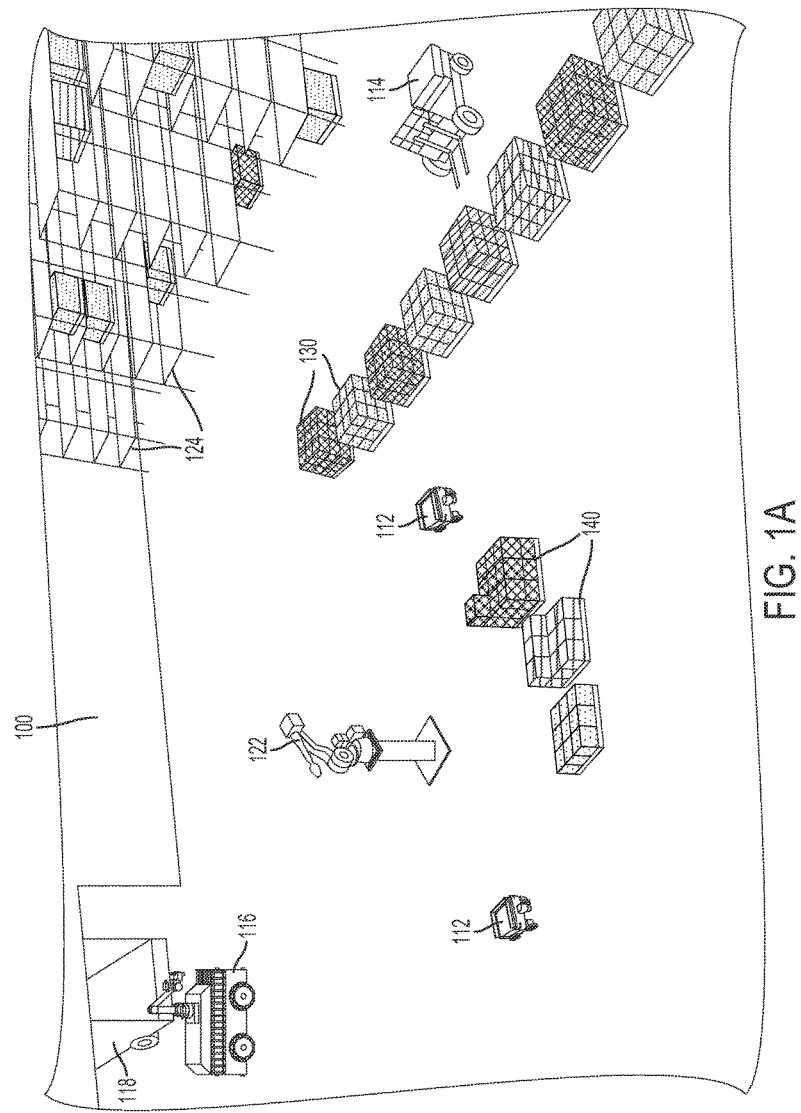

HETEROGENEOUS FLEET OF ROBOTS FOR COLLABORATIVE OBJECT PROCESSING

BACKGROUND

Unless otherwise indicated herein, the materials described in this section are not prior art to the claims in this application and are not admitted to be prior art by inclusion in this section.

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may provide for a heterogeneous fleet of robotic devices for collaborative object processing in an environment, such as a warehouse. More specifically, the fleet may include one or more mobile robotic devices that may be used to transport objects such as boxes within a warehouse. Additionally, the fleet may include one or more fixed robotic devices that serve as fixed manipulation stations at particular locations within the warehouse. For instance, a robotic arm mounted on a pedestal may be installed and used to manipulate objects within reach of the robotic arm. Within examples, one or more of the mobile robotic devices may transport objects to a fixed robotic manipulator, which may then distribute the objects to one or more other mobile robotic devices for delivery to locations within the warehouse. For instance, the objects may be delivered to one or more robotic truck loaders to load the objects onto a delivery truck for transport out of the warehouse.

In one example, a system is provided that includes a plurality of mobile robotic devices that are configured to transport one or more objects within an environment, a fixed robotic manipulator positioned within the environment that is configured to manipulate one or more objects within an area of reach of the fixed robotic manipulator, and a control system. The control system may be configured to cause one or more of the plurality of mobile robotic devices to deliver at least one object to at least one location within the area of reach of the fixed robotic manipulator, and to cause the fixed robotic manipulator to distribute the at least one object to a different one or more of the plurality of mobile robots for delivery to one or more other locations within the environment.

In a further example, a method is provided that includes causing one or more mobile robotic devices to deliver one or more objects to at least one location within an area of reach of a fixed robotic manipulator, where the fixed robotic manipulator is positioned within an environment. The method may also include causing one or more other mobile robotic devices to move within the area of reach of the fixed robotic manipulator. The method may additionally include causing the fixed robotic manipulator to distribute the one or more objects to the one or more other mobile robotic devices located within the area of reach of the fixed robotic manipulator. The method may also include causing the one or more other mobile robotic devices to transport the one or more objects to one or more other locations within the environment.

In another example, a device is disclosed that includes a fixed robotic manipulator positioned within an environment that is configured to manipulate one or more objects within an area of reach of the fixed robotic manipulator, and a control system. The control system may be configured to identify a plurality of objects located within the area of reach of the fixed robotic manipulator, identify a plurality of mobile robotic devices located within the area of reach of the fixed robotic manipulator, and cause the fixed robotic manipulator to distribute the plurality of objects to one or more of the plurality of mobile robotic devices for delivery to one or more other locations within the environment.

In yet another example, a system may include means for causing one or more mobile robotic devices to deliver one or more objects to at least one location within an area of reach of a fixed robotic manipulator, where the fixed robotic manipulator is positioned within an environment. The system may also include means for causing one or more other mobile robotic devices to move within the area of reach of the fixed robotic manipulator. The system may additionally include means for causing the fixed robotic manipulator to distribute the one or more objects to the one or more other mobile robotic devices located within the area of reach of the fixed robotic manipulator. The system may also include means for causing the one or more other mobile robotic devices to transport the one or more objects to one or more other locations within the environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 1A shows a robotic fleet, according to an example embodiment.

DETAILED DESCRIPTION

Figure 1B:
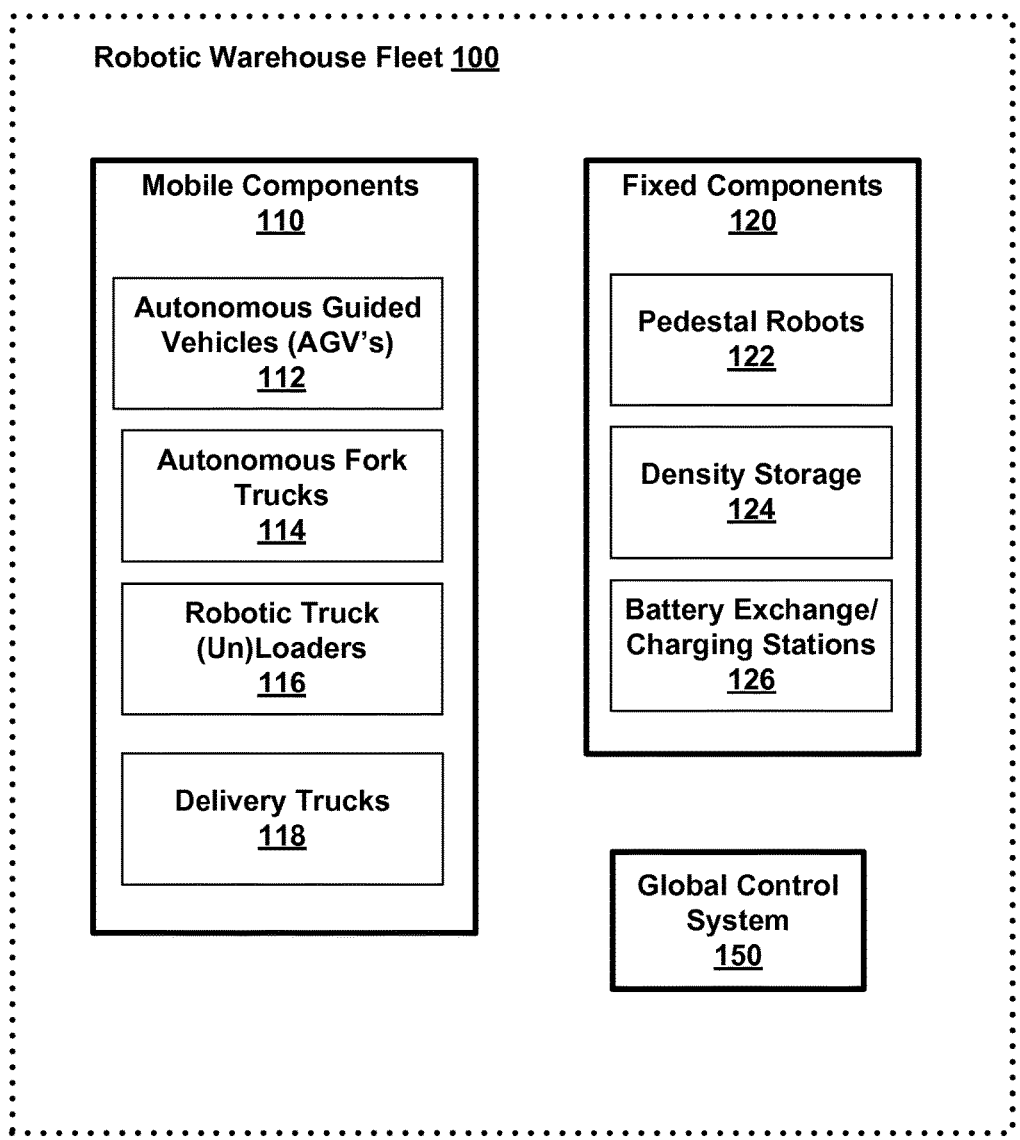
FIG. 1B is a functional block diagram illustrating components of a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Within examples, a fleet of robots may be used for order fulfillment or distribution within a warehouse. The fleet may include different types of robots with different groups of tasks assigned to each type. For instance, some types of robots may have robotic arms to manipulate packages or other objects while other types of robots do not have arms. As another example, some types of robots may be mobile to transport packages while other types of robots are fixed within the environment. Possible benefits may therefore be attained through specialization of different types of robots. Additionally, the robots can be coordinated by a central control system and also may collaborate locally to complete jobs. For example, robots of a number of different types may collaborate to stack boxes onto a pallet and load the pallet onto a delivery truck for transport to a destination outside of the warehouse.

Example systems may contain several types of robotic devices to facilitate package processing. One possible type is an autonomous guided vehicle (AGV), a small mobile robotic device that transports individual packages or groups of packages within the warehouse. Another possible type is a fixed robotic manipulation station that can move around individual packages or stack and unstack pallets. For instance, the fixed robotic manipulation station could be a robotic arm mounted on a pedestal. An additional possible type of robotic device is an autonomous fork truck for lifting and moving pallets of packages, such as a pallet jack or forklift. Another possible type is a robotic truck unloader with a robotic manipulator that may be configured to load packages to and/or unload packages from a delivery truck that may be parked adjacent to the warehouse. Example systems may include different types and numbers of robotic devices, may include some types not explicitly described, and may also not contain all of the described types of robotic devices.

As an example of system operation, a pallet of cases may need to be distributed so that one case goes into each of several delivery trucks. A pallet jack may bring the pallet of cases over to a fixed robotic manipulator mounted on a pedestal to distribute individual cases to each of several AGVs. The AGVs may line up or otherwise gather around the fixed robotic manipulator, communicate to the fixed robotic manipulator where they are, and also tell the fixed robotic manipulator relevant identifying information (e.g., identification numbers). A central control system may then instruct the fixed robotic manipulator to pick cases off the pallet and give them to individual AGVs based on target delivery locations for the cases. Each of the AGVs may then be assigned to transport the cases to robotic truck loaders for loading onto several adjacent delivery trucks.

A robotic warehouse fleet may be used for a variety of different types of applications, including order fulfillment, distribution, and cross-docking. A global control system may assign tasks to different robotic devices in the fleet to complete jobs related to package processing, storing, and/or transporting. In further examples, the global control system of the robotic fleet may also coordinate with other entities outside the warehouse. For example the control system may coordinate with other warehouses (possibly containing separate fleets of robots), delivery trucks coming to or leaving the warehouse, and/or remote human operators.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quad-copters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
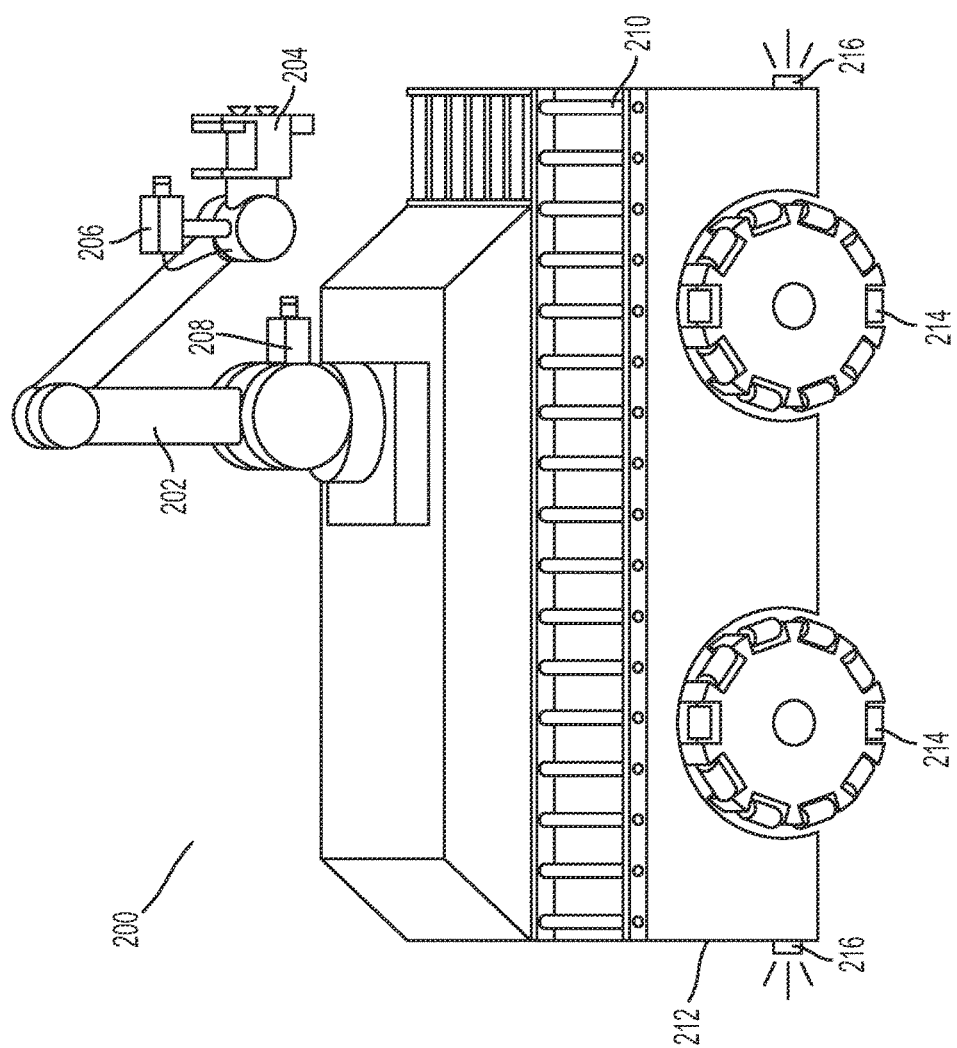
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
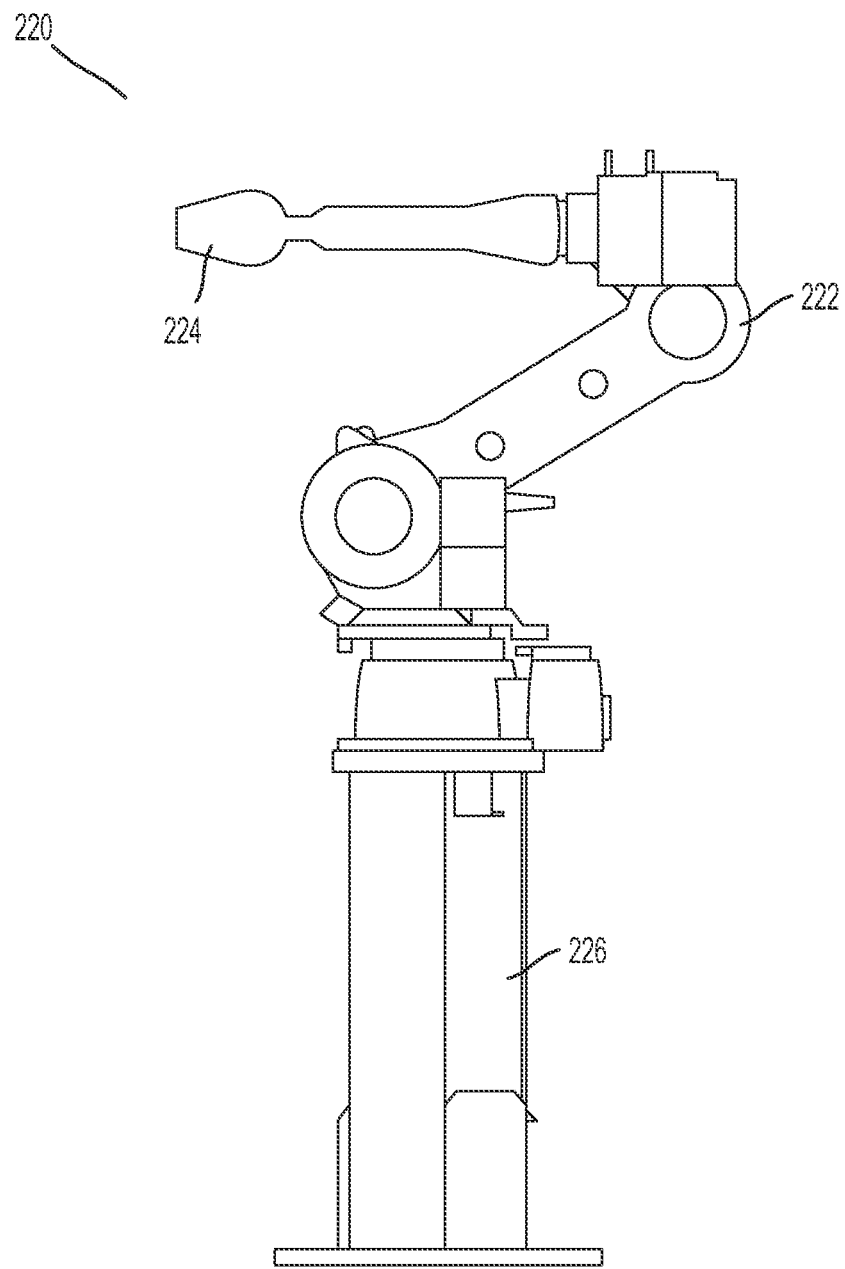
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
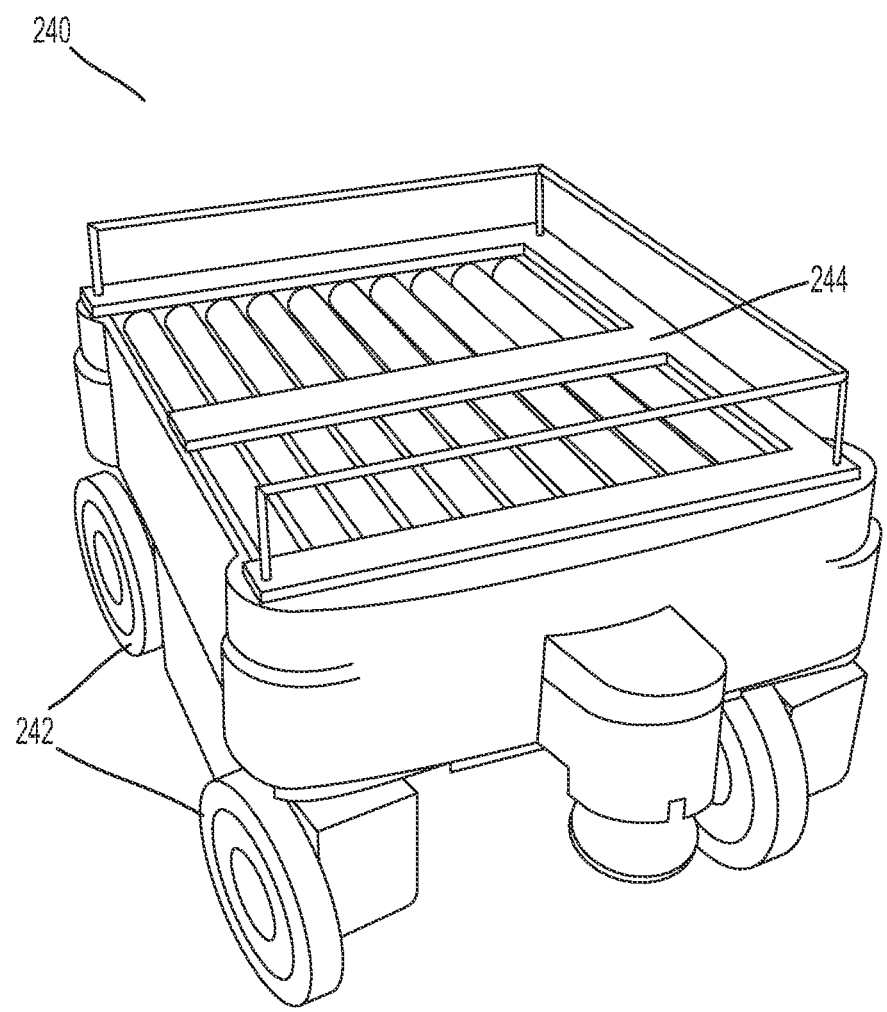
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
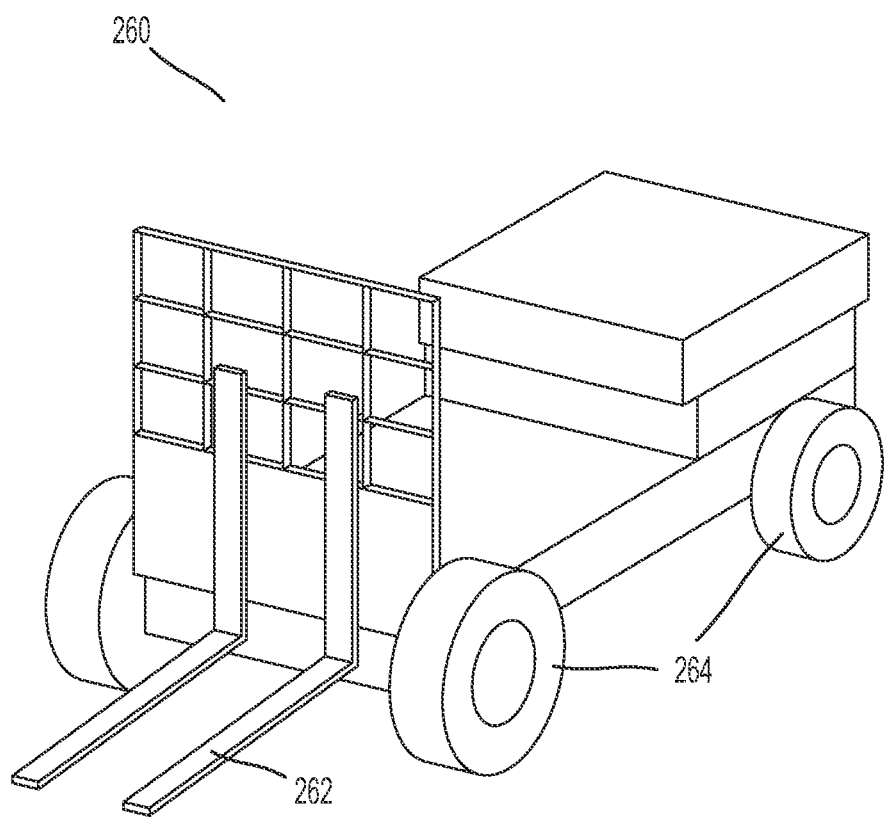
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

FIGS. 3A, 3B, 3C, 3D, and 3E collectively illustrate example operation of a robotic fleet in a warehouse, according to an example embodiment. More specifically, a robotic fleet containing different types of robots with different types of assigned tasks may be deployed within warehouse 300. Different robotic devices may operate independently at the same time according to instructions from a centralized control system or hive mind to complete jobs, such as receiving object, storing objects, retrieving objects from storage, transporting objects, delivering objects from the warehouse, or otherwise processing objects. Additionally, in some examples, two or more robotic devices may collaborate to perform jobs together, possibly leveraging specialized equipment or functionality of individual robotic devices.

Figure 3A:
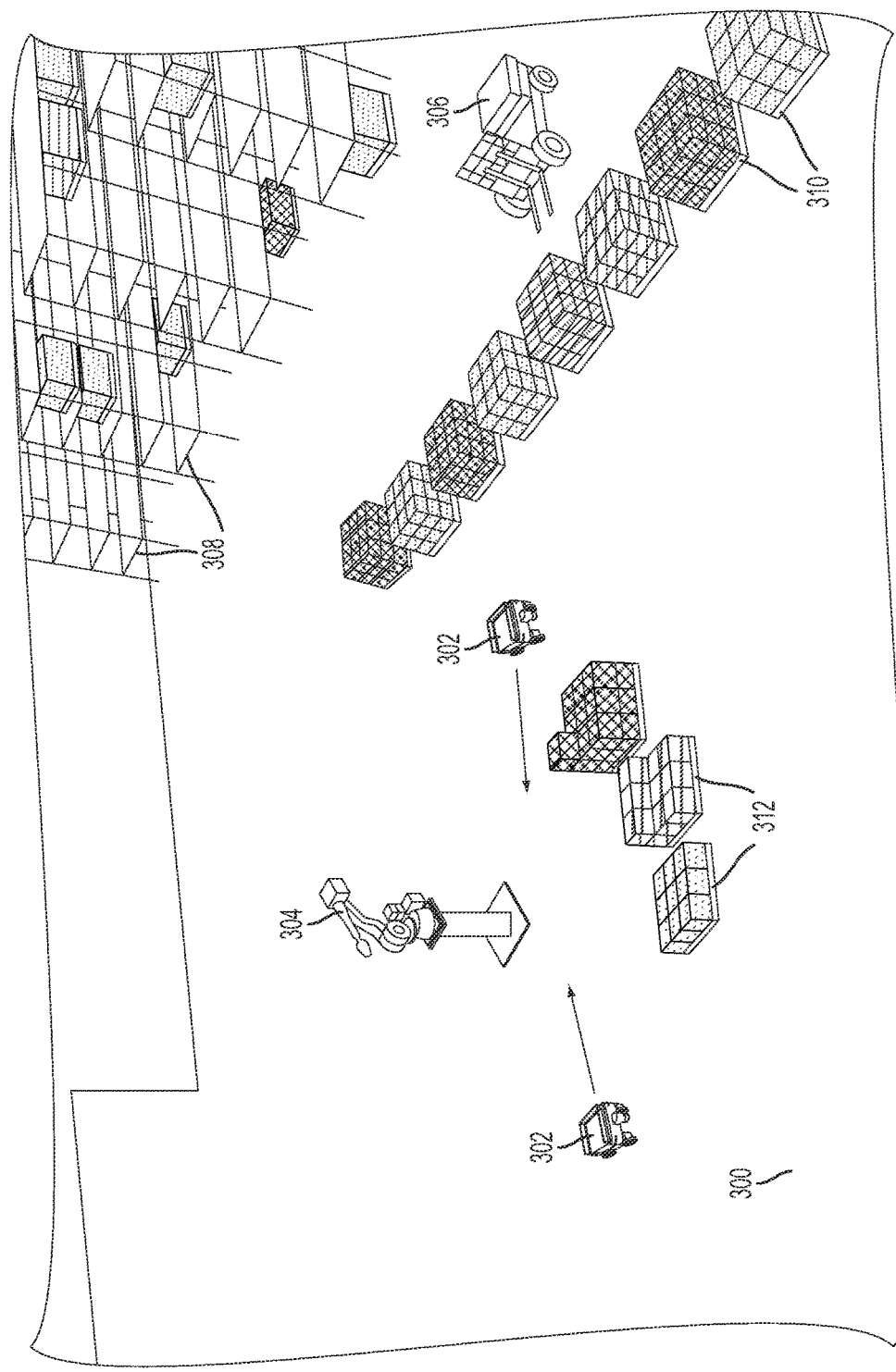
FIGS. 3A, 3B, 3C, 3D, and 3E illustrate example operation of a robotic fleet in a warehouse, according to an example embodiment.

In reference to FIG. 3A, a robotic fleet may include multiple AGV's 302 for quickly transporting small totes, such as individual boxes or objects. The AGV's 302 may be assigned by a centralized control system to move to particular areas of warehouse 300 to pick up boxes for transport to another location, such as to store boxes or to move boxes to a location to await delivery from the warehouse 300. In some examples, the AGV's 302 may be assigned to move within an area of reach of a fixed robotic manipulator, such as pedestal robot 304. More specifically, pedestal robot 304 may be an elevated robotic arm that is configured to pick up or otherwise move nearby objects. In some examples, the pedestal robot 304 may be capable of constructing or deconstructing nearby pallets 312 of boxes. In additional examples, the pedestal robot 304 may be operable to remove objects from or place particular objects on the AGV's 302 once they have moved within an area of reach of pedestal robot 304.

In further examples, different types of fixed robotic manipulation stations may be positioned within warehouse 300 as well or instead. For instance, instead of using a robotic arm with a gripper, a different type of robotic manipulator may be used, possibly depending on the types of objects stored within warehouse 300, or types of actions needed to processes those objects. In additional examples, a fixed robotic manipulator may be configured to open boxes to manipulate items within the boxes as well. For instance, the robotic fleet may process a case containing a number of copies of a particular consumer product. A fixed robotic manipulator may be capable of opening the case and placing individual copies of the product into packaging within separate individual boxes (possibly carried by AGV's) for eventual shipment out of the warehouse.

The robotic fleet may additionally contain other types of mobile robotic devices for transport of different types or sizes of totes. For example, an autonomous fork truck 306 may be used to pick up and transport pallets, flat support structures upon which boxes may be stacked. In some examples, storage racks 308 within warehouse 300 may be used to store pallets of boxes, possibly pallets that are transported to and/or from the racks by autonomous fork truck 308. In additional examples, certain pallets 310 may be placed at particular locations within the warehouse 300 to await further processing. For instance, one of the pallets 310 may be left at a chosen location until a mobile robot is free to move the pallet, until a pedestal robot 304 is free to manipulate boxes on the pallet, or until a delivery truck arrives at the warehouse to transport the pallet to another location outside the warehouse.

Figure 3B:
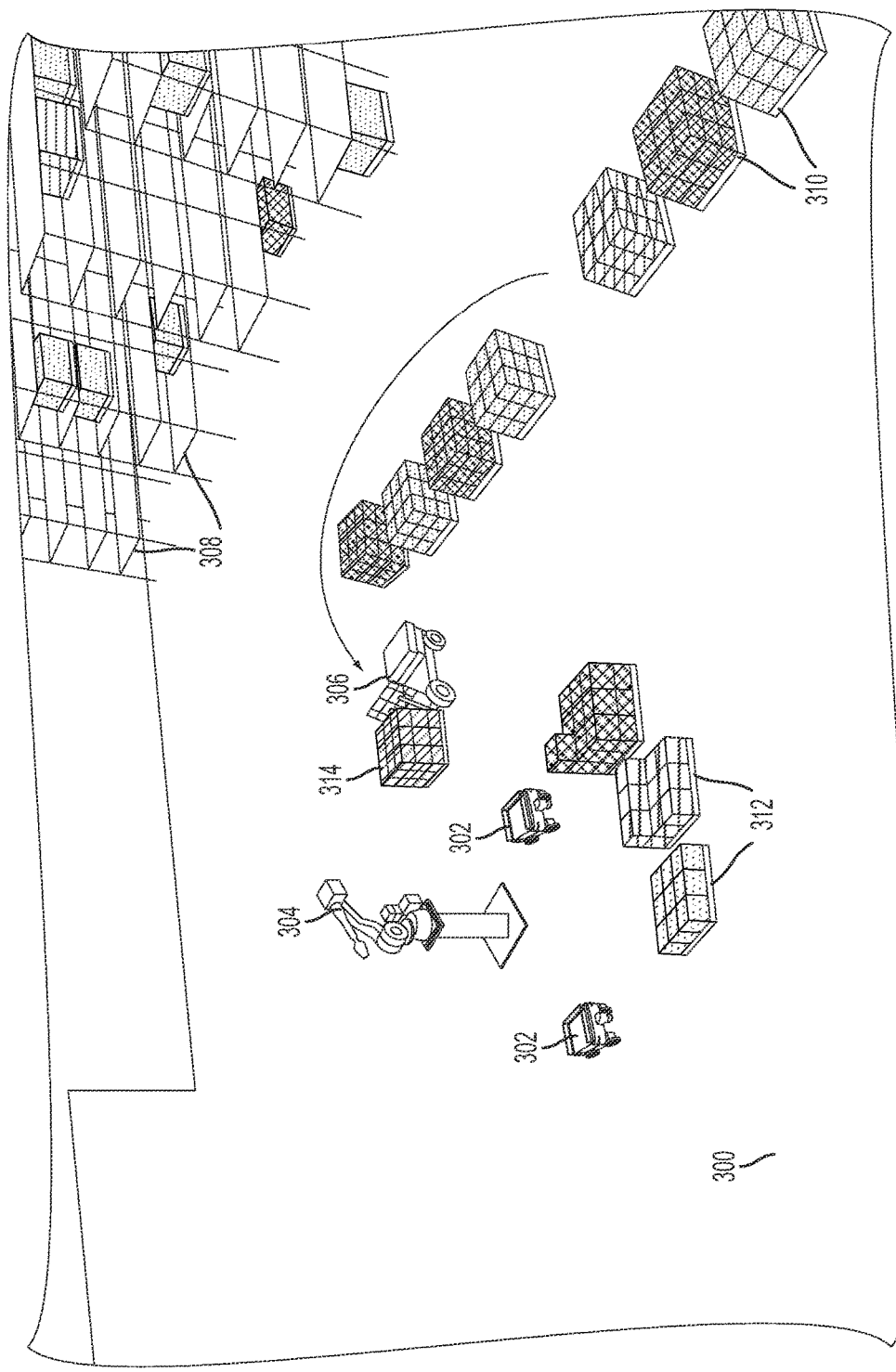

In reference to FIG. 3B, autonomous fork truck 306 may be assigned to transport a particular pallet 314 of boxes to an area within reach of pedestal robot 304. For instance, the pallet 314 may contain boxes of a particular type. After the autonomous fork truck 306 transports the pallet 314 to a location where the robotic arm of the pedestal robot 304 can reach the boxes on the pallet 314, the pedestal robot 304 may then redistribute boxes from pallet 314 to other areas within reach, such as onto other pallets 312 or onto one of the nearby AGV's 302 for transport to other locations within warehouse 300.

In some examples, the autonomous fork truck 306 may move to an area within reach of the pedestal robot 304 and may then drop off the pallet 314 on the ground at a point where the pedestal robot 304 can reach some or all of the boxes on the pallet 314. In further examples, after dropping off the pallet 314, the autonomous fork truck 306 may then leave the area to perform a different task, such as to retrieve another pallet from storage racks 308 or from pallets 310 currently stored on the ground within warehouse 300. In other examples, the autonomous fork truck 306 may pick up and move a different pallet 312 within reach of pedestal robot 304 after dropping off pallet 314, which may be a pallet that was partially or fully constructed by pedestal robot 304.

Figure 3C:
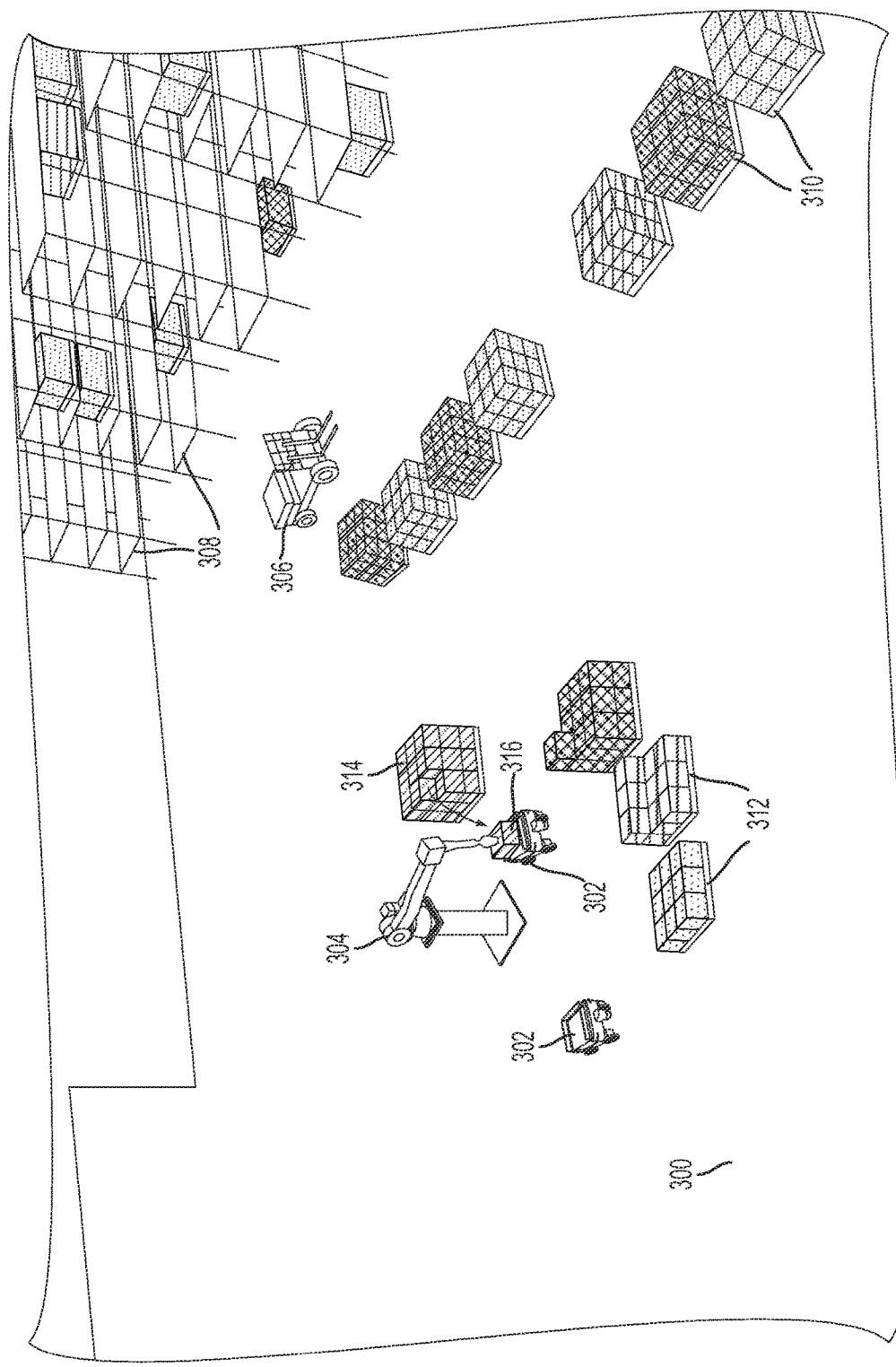

FIG. 3C illustrates the pallet 314 of boxes placed on the ground within warehouse 300 at a location within reach of pedestal robot 304. The autonomous fork truck 306 may then move away to perform a different task at another location. Once the pallet 314 is placed within reach of pedestal robot 304, the pedestal robot 304 may be controlled to pick up or move boxes from or to the pallet 314. In some examples, the pedestal robot 304 may distribute boxes from the pallet 314 to one or more AGV's 302, which may be commanded to sit and wait until the pedestal robot 304 has finished moving the boxes. For instance, as illustrated in FIG. 3C, the robotic arm of pedestal robot 304 may use its gripper to move a box off of pallet 314 and onto one of the AGV's 302 for delivery to another location within warehouse 300.

In some examples, the pedestal robot 304 may use one or more optical sensors to identify nearby objects and/or robotic devices. For instance, data from the optical sensors may enable a control system of the pedestal robot 304 to identify where the pallet 314 or particular boxes on pallet 314 are with respect to the pedestal robot 304. In some examples, visual data may be used to determine the location of pallet 314 or boxes on pallet 314 by identifying one or more visual tags on the pallet 314 or the boxes. In additional examples, the visual tags may also contain identifying information, such as numbers that correspond to particular objects or particular types or products.

In further examples, the pedestal robot 304 may also identify the location and/or identifying information for one or more of the AGV's 302 within the area of reach of the pedestal robot 304. For instance, the pedestal robot 304 may use visual data from one or more optical sensors to locate particular ones of the AGV's 302 in order to move objects to or from the AGV's 302. In some examples, the pedestal robot 304 may determine the relative positioning of the AGV's 302 based on a visual handshake, in which one or both of the pedestal robot 304 and an AGV 302 identify one or more visual tags or other identifying parts on the other robotic device. In further examples, one of the AGV's 302 may adjust its position based on the visual handshake to facilitate a box handoff, such as by moving to a location within reach of the pedestal robot 304 that minimizes the amount of movement needed by the robotic arm or gripper of the pedestal robot 304.

In additional examples, the pedestal robot 304 may identify multiple objects within reach as well as multiple mobile robotic devices, such as AGV's. In some cases, a control system of the pedestal robot 304 may determine a mapping between the mobile robotic devices and target delivery locations for those mobile robotic devices. For instance, a global control system may communicate to the control system of the pedestal robot 304 where each of the nearby AGV's will be traveling to next. In other examples, control systems on each of the AGV's may communicate to the pedestal robot 304 where they are planning to go next (e.g., where they are planning to deliver objects they are carrying). Based on this mapping, the pedestal robot 304 may select some of the nearby objects and move them onto selected nearby AGV's in order to enable transport of those objects to their target locations. Accordingly the pedestal robot 304 may effectively function as a distribution station that causes objects to be sent to different locations all over the warehouse 300. Control functions may be distributed across different types of robotic devices within the fleet in other ways as well.

Figure 3D:
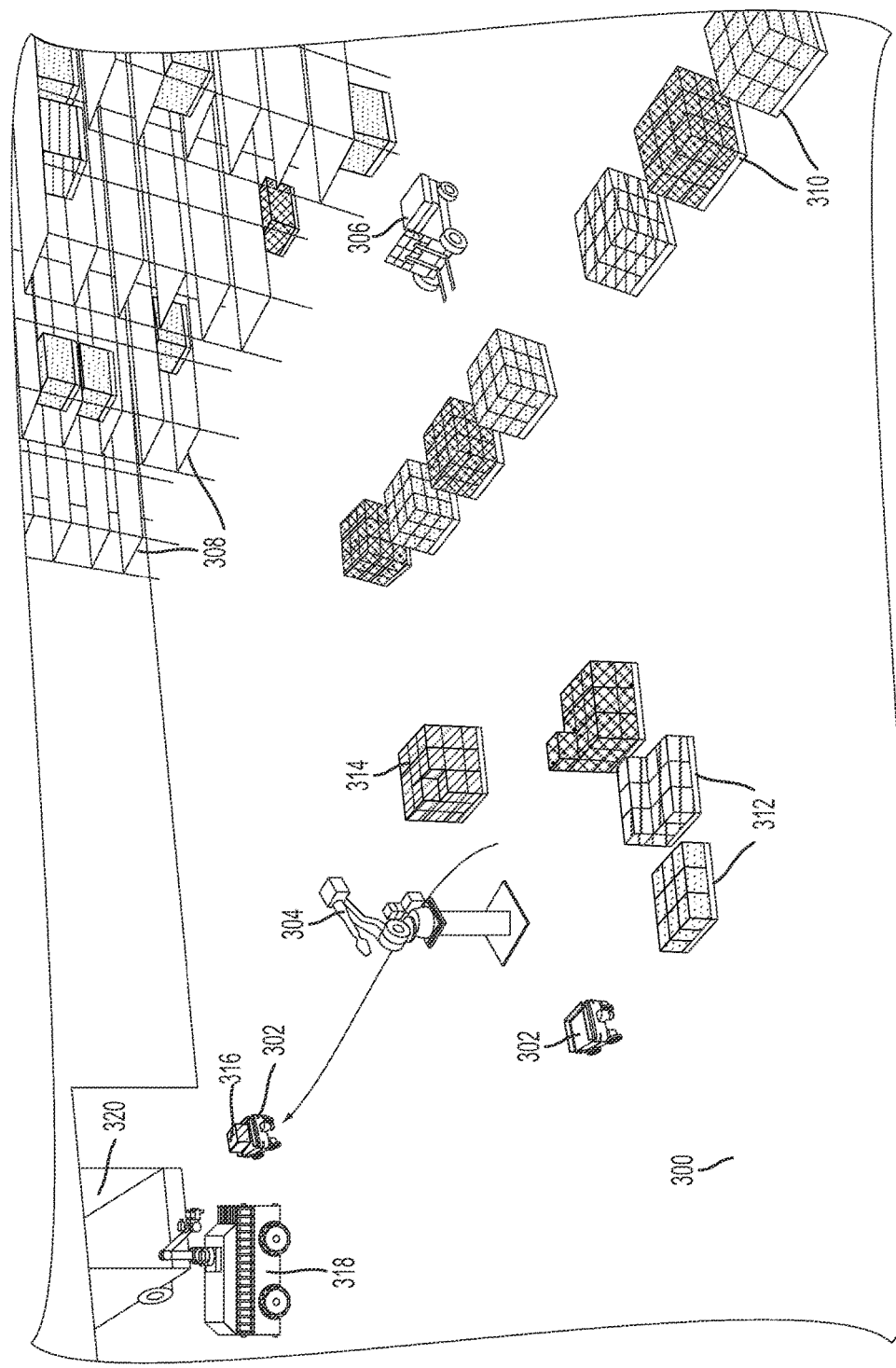

In reference to FIG. 3D, an AGV 302 may be controlled to transport the box 316 after receiving the box 316 from pedestal robot 304. For instance, the AGV 302 may transport the box 316 to another location within warehouse 300 for eventual delivery out of the warehouse. In the illustrated example, the AGV 302 may transport the box 316 to a location within an area of reach of robotic truck loader 318. The robotic truck loader 318 may include a robotic arm with a gripper and/or other equipment to facilitate loading objects onto a delivery truck 320 or a different type of vehicle. In some examples, the robotic truck loader 318 may include wheels as shown which may enable the robotic truck loader 318 to move around within the warehouse 300, possibly to load delivery trucks parked at different docks adjacent to the warehouse 300. In other examples, one or more robotic truck loaders could be fixed within the environment as well.

The AGV's 302 may deliver different numbers and types boxes to the robotic truck loader 318 for loading onto delivery truck 320 depending on where the delivery truck 320 is planned to go. In some examples, a global control system of the fleet may control different robotic devices within the fleet, including AGV's 302, autonomous fork truck 306, pedestal robot 304, and/or robotic truck loader 318 to ensure that the correct numbers and types of packages get loaded onto the delivery truck 320 for delivery outside of warehouse 300. In some example, the global control system may also coordinate with other entities as well, such as robotic devices within a fleet at a different warehouse that may be the next destination for delivery truck 320.

Figure 3E:
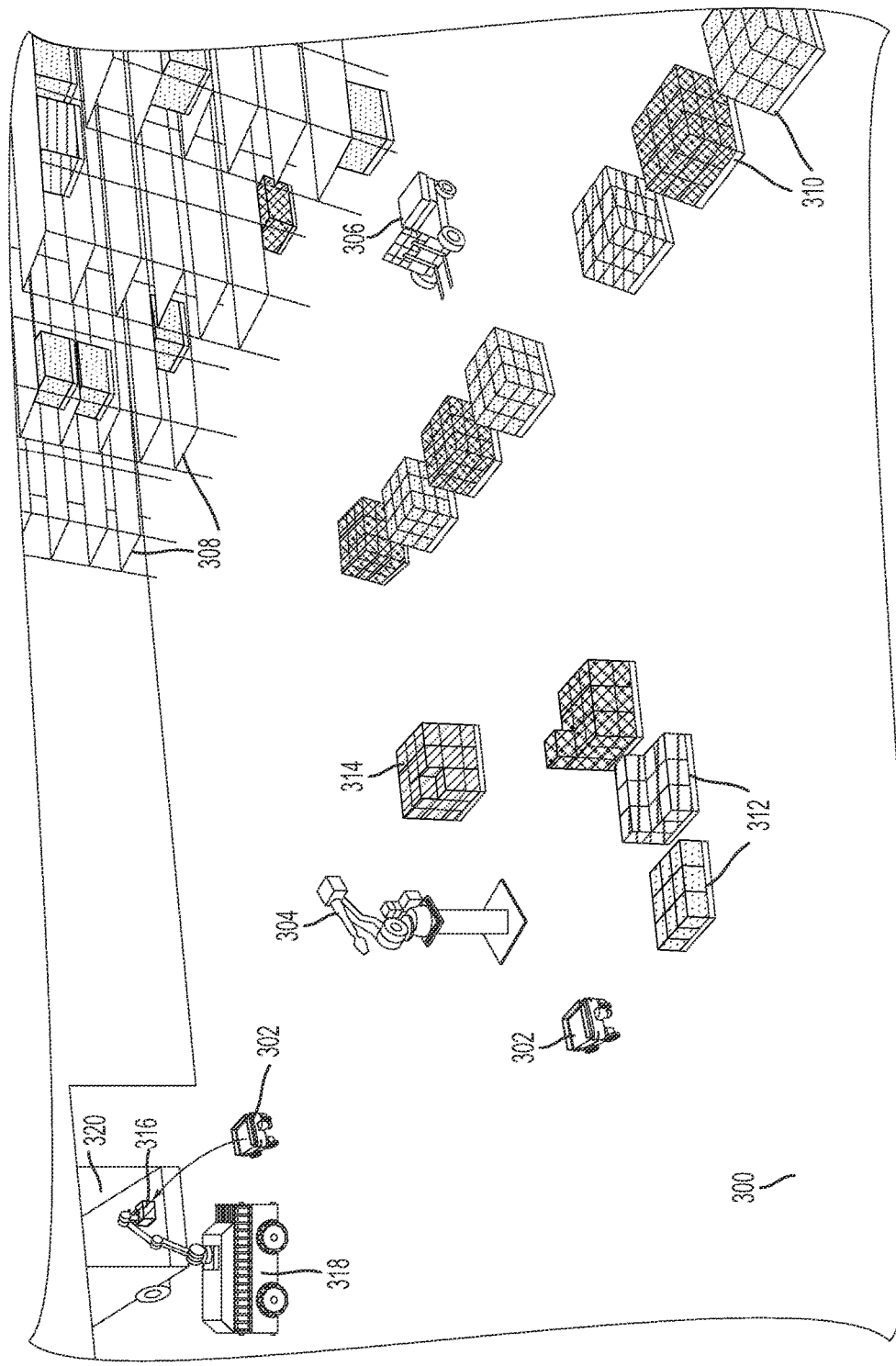

FIG. 3E shows the box 316 being loaded from AGV 302 onto delivery truck 320 by robotic truck loader 318. In some examples, the robotic truck loader 318 and the pedestal robot 304 may be elevated at roughly the same height. Accordingly, symmetry may be achieved between the height from which the robotic arm of the pedestal robot 304 placed a box onto the AGV 302 and the height from which the robotic arm of the truck loader 318 picks up the box off the of the AGV 302. In some examples, this symmetry may allow for boxes to be placed in positions and/or orientations by the pedestal robot 304 that are easily accessible for the robotic arm on the truck loader 318 in order to pick up the boxes.

As previously noted, the examples illustrated, particularly those in FIGS. 3A, 3B, 3C, 3D, and 3E, could involve other or different steps, possibly involving less or more numbers or types of robotic devices. For instance, the illustrated process could be reversed to unload an object from a delivery truck using a robotic truck unloader, transport the object to a pedestal robot using an AGV, place the object onto a pallet using the pedestal robot, and then move the pallet containing the object onto a storage rack using an autonomous fork truck. Additionally, many of the types of operations described and illustrated could be executed in parallel by other robotic devices operating within the warehouse. For instance, a robotic fleet within a warehouse may include a number of different pedestal robots positioned at different locations that may be simultaneously performing operations, such as moving objects to or from AGV's and constructing or deconstructing pallets.

Figure 4:
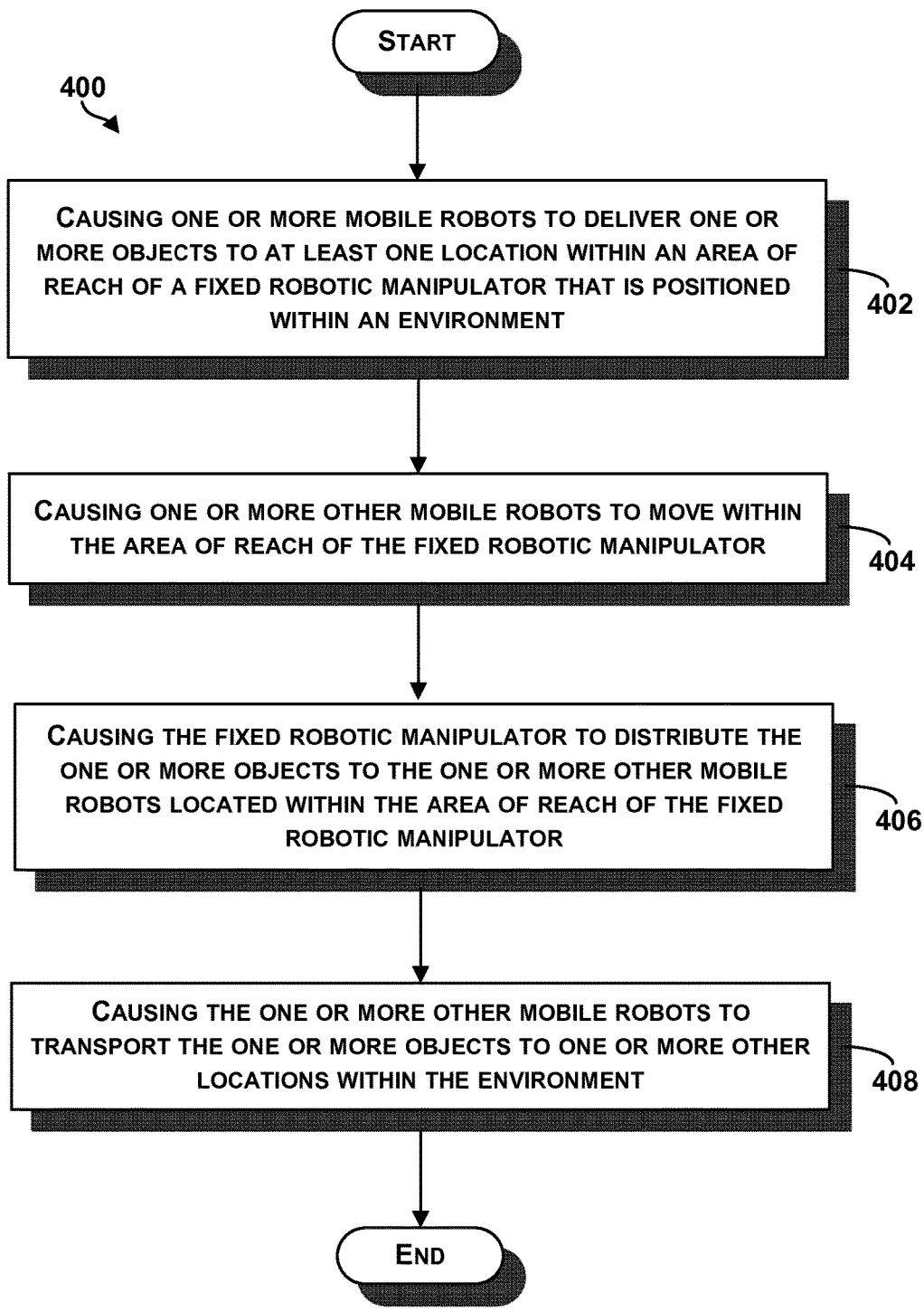
FIG. 4 is a block diagram of a method, according to an example embodiment.

FIG. 4 illustrates a flowchart showing a method 400 that may allow for control of robots within a robotic fleet, according to an example embodiment. Method 400 may be carried out using a robotic fleet, such as illustrated and described with respect to FIGS. 1A-1B. In some examples, method 400 may be executed by a global control system of a robotic fleet, such as global control system 150 described with respect to FIG. 1B. In additional examples, part or all of method 400 may be performed by one or more local control systems of one or more robotic devices within the robotic fleet. Additionally, method 400 may involve the use of one or more of the different types of robotic devices illustrated and described in FIGS. 2A, 2B, 2C, and 2D, as well as other types of robotic devices not specifically described.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 4. Where used, program code can be stored on any type of computer-readable medium, for example, such as a storage device including a disk or hard drive.

In addition, each block of the flowchart shown in FIG. 4 may represent circuitry that is wired to perform the specific logical functions in the process. Unless specifically indicated, functions in the flowchart shown in FIG. 4 may be executed out of order from that shown or discussed, including substantially concurrent execution of separately described functions, or even in reverse order in some examples, depending on the functionality involved, so long as the overall functionality of the described method is maintained.

As shown by block 402 of FIG. 4, method 400 may involve causing one or more mobile robots to deliver one or more objects to at least one location within an area of reach of a fixed robotic manipulator. In some examples, the mobile robots may include AGV's or other relatively small robots that transport individual objects or small numbers of objects to the fixed robotic manipulator. In additional examples, the mobile robots may include autonomous fork trucks or other larger robots that transport pallets of objects or large numbers of objects to the fixed robotic manipulator. In further examples, the fixed robotic manipulator may be a robotic arm elevated on a pedestal.

Additionally, a control system may cause the mobile robots to move to locations within reach of a fixed robotic manipulator in a number of different ways. For instance, in one example, a global control system may transmit general instructions such as a destination for an AGV relative to a digital map. A local control system of the AGV may then be used to perform various navigation functions to enable the AGV to determine a route to move to the destination. In another example, the global control system may send an AGV instructions identifying a particular fixed robotic manipulator to deliver one or more objects to, and then a local control system of the AGV may take over to find an available location within reach of the fixed robotic manipulator. Control may be split across global and local control systems of different robotic devices in other ways as well.

Method 400 may further involve causing one or more other mobile robots to move within the area of reach of the fixed robotic manipulator, as shown by block 404. In some examples, the other mobile robots may include AGV's, autonomous fork trucks, and/or other types of mobile robots capable of transporting single objects or groups of objects. In additional examples, the other mobile robots may be instructed to move within range of the fixed robotic manipulator after certain objects have already been transported to locations within the area of reach of the fixed robotic manipulator. In further examples, the other mobile robots may instead be instructed to move near to the fixed robotic manipulator in advance to be ready to take objects as soon as they arrive.

Method 400 may also involve causing the fixed robotic manipulator to distribute the one or more objects to the one or more other mobile robots located within the area of reach of the fixed robotic manipulator, as shown by block 406. In some examples, objects may be distributed by moving objects directly from one mobile robot to another. In other examples, objects may first be placed on the ground near the fixed robotic manipulator before being distributed to the other mobile robots at a later point in time. In further examples, distribution of objects may involve deconstructing one or more pallets of objects by the fixed robotic manipulator and/or constructing one or more pallets of objects to place on one or more of the other mobile robots.

Method 400 may additionally involve causing the one or more other mobile robots to transport the one or more objects to one or more other locations, as shown by block 408. In some examples, objects or pallets of objects may be transported by the mobile robots for loading on delivery trucks for delivery out of a warehouse. In other examples, objects or pallets of objects may be transported by the mobile robots for storage in storage racks or other storage locations within a warehouse. After receiving objects from the fixed robotic manipulator, the mobile robots may transport objects to other locations in some examples as well, possibly including multiple destinations for different individual objects.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system, comprising:
    a fixed robotic manipulator positioned within an environment that is configured to manipulate one or more objects within an area of reach of the fixed robotic manipulator;
    a first mobile robotic device that is configured to:
        receive, from a global control system, instructions to deliver an object to within the area of reach of the fixed robotic manipulator;
        receive, from at least one sensor on the first mobile robotic device, first sensor data indicative of a surrounding area of the fixed robotic manipulator;
        process, by a local control system of the first mobile robotic device, the received first sensor data indicative of the surrounding area of the fixed robotic manipulator to find an available location within the area of reach of the fixed robotic manipulator; and
        navigate to the available location with the object to be moved by the fixed robotic manipulator; and
    a second mobile robotic device that is configured to:
        receive, from the global control system, instructions to navigate to within the area of reach of the fixed robotic manipulator to receive the object;
        receive, from at least one sensor on the second mobile robotic device, second sensor data indicative of the surrounding area of the fixed robotic manipulator;
        process, by a local control system of the second mobile robotic device, the received second sensor data indicative of the surrounding area of the fixed robotic manipulator to find a different available location within the area of reach of the fixed robotic manipulator, and
        navigate to the different available location to receive the object from the fixed robotic manipulator for delivery to another location within the environment, wherein the fixed robotic manipulator and the second mobile robotic device are further configured to perform a visual handshake in which the fixed robotic manipulator and the second mobile robotic device identify one or more visual tags on each other to facilitate moving of the object by the fixed robotic manipulator onto the second mobile robotic device.

2. The system of claim 1, wherein the fixed robotic manipulator comprises a robotic arm elevated on a pedestal.

3. The system of claim 1, wherein the first mobile robotic device comprises an autonomous fork truck that is configured to lift and transport a pallet of objects that includes the object to the available location within the area of reach of the fixed robotic manipulator.

4. The system of claim 3, wherein the autonomous fork truck is further configured to transport the pallet of objects to the available location within the area of reach of the fixed robotic manipulator by placing the pallet of objects on a ground floor within the environment at the available location before the second mobile robotic device arrives within the area of reach of the fixed robotic manipulator.

5. The system of claim 3, wherein the second mobile robotic device comprises an autonomous guided vehicle that is configured to transport only the object from the pallet of objects to a target delivery location within the environment.

6. The system of claim 1, wherein the second mobile robotic device comprises an autonomous fork truck that is configured to transport a pallet of objects that includes the object to a target delivery location within the environment.

7. The system of claim 6, wherein the fixed robotic manipulator is further configured to form the pallet of objects from a plurality of objects within the area of reach of the fixed robotic manipulator.

8. The system of claim 1, wherein when the second mobile robotic device arrives within the area of reach of the fixed robotic manipulator at a time before the first mobile robotic device arrives, the second mobile robotic device is configured to wait within the area of reach of the fixed robotic manipulator for the first mobile robotic device to deliver the object.

9. The system of claim 1, wherein the second mobile robotic device is controlled to navigate to the different available location within the area of reach of the fixed robotic manipulator to receive the object at a time after the first mobile robotic device has delivered the object to the available location within the area of reach of the fixed robotic manipulator.

10. The system of claim 1, further comprising a robotic truck loader, wherein the second mobile robotic device is configured to deliver the object to the robotic truck loader for loading onto a delivery truck.

11. The system of claim 1, wherein:
    the fixed robotic manipulator comprises a robotic arm elevated on a pedestal that includes a pallet-shaped bottom surface; and
    the system further comprises at least one autonomous fork truck that is configured to pick up the pallet-shaped bottom surface of the pedestal to move the pedestal from one location to another location within the environment.

12. The system of claim 1, wherein the fixed robotic manipulator is further configured to move the object from the first mobile robotic device to the second mobile robotic device by picking up the object off of the first mobile robotic device and directly placing the object onto the second mobile robotic device.

13. The system of claim 1, wherein the first mobile robotic device is further configured to provide a first communication signal indicating that the object is located at the available location after navigating to the available location, and wherein the second mobile robotic device is further configured to provide a second communication signal indicating that the second mobile robotic device is located at the different available location to receive the object after navigating to the different available location.

14. The system of claim 13, wherein the fixed robotic manipulator is further configured to identify the object located at the available location based on the first communication signal and identify the second mobile robotic device located at the different available location based on the second communication signal before moving the object onto the second mobile robotic device.

15. The system of claim 1, wherein the second mobile robotic device is further configured to reposition itself based on the visual handshake to facilitate receiving the object from the fixed robotic manipulator.

16. The system of claim 1, wherein the second mobile robotic device is further configured to select the different available location to minimize an amount of movement for the fixed robotic manipulator to move the object onto the second mobile robotic device.

17. A method, comprising:
  receiving, by a first mobile robotic device from a global control system, instructions to deliver an object to within an area of reach of a fixed robotic manipulator, wherein the fixed robotic manipulator is positioned within an environment;
  receiving, by the first mobile robotic device from at least one sensor on the first mobile robotic device, first sensor data indicative of a surrounding area of the fixed robotic manipulator;
  processing, by a local control system of the first mobile robotic device, the received first sensor data indicative of the surrounding area of the fixed robotic manipulator to find an available location within the area of reach of the fixed robotic manipulator;
  navigating, by the first mobile robotic device, to the available location with the object to be moved by the fixed robotic manipulator;
  receiving, by a second mobile robotic device from the global control system, instructions to navigate to within the area of reach of the fixed robotic manipulator to receive the object;
  receiving, by the second mobile robotic device from at least one sensor on the second mobile robotic device, second sensor data indicative of the surrounding area of the fixed robotic manipulator;
  processing, by a local control system of the second mobile robotic device, the received second sensor data indicative of the surrounding area of the fixed robotic manipulator to find a different available location within the area of reach of the fixed robotic manipulator;
  navigating, by the second mobile robotic device, to the different available location to receive the object from the fixed robotic manipulator;
  performing, by the fixed robotic manipulator and the second mobile robotic device, a visual handshake in which the fixed robotic manipulator and the second mobile robotic device identify one or more visual tags on each other to facilitate moving of the object by the fixed robotic manipulator onto the second mobile robotic device;
  moving, by the fixed robotic manipulator, the object onto the second mobile robotic device located at the different available location within the area of reach of the fixed robotic manipulator; and
  transporting, by the second mobile robotic device, the object to another location within the environment.

18. The method of claim 17, further comprising delivering, by the first mobile robotic device, a pallet of objects that includes the object to the available location within the area of reach of the fixed robotic manipulator.

\* \* \* \* \*